(12) United States Patent
Koshino et al.

(10) Patent No.: US 8,014,348 B2
(45) Date of Patent: Sep. 6, 2011

(54) RADIO ACCESS NETWORK SYSTEM, RADIO ACCESS METHOD, AND CONTROL APPARATUS

(75) Inventors: Masayuki Koshino, Fujisawa (JP); Mayu Yamada, Yokohama (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1018 days.

(21) Appl. No.: 10/720,155

(22) Filed: Nov. 25, 2003

(65) Prior Publication Data
US 2004/0105452 A1 Jun. 3, 2004

(30) Foreign Application Priority Data

Nov. 26, 2002 (JP) ................................. 2002-342448

(51) Int. Cl.
*H04W 4/00* (2009.01)
(52) U.S. Cl. ........ 370/329; 370/401; 370/351; 455/445; 709/226
(58) Field of Classification Search .................. None
See application file for complete search history.

(56) References Cited

U.S. PATENT DOCUMENTS

| | | | |
|---|---|---|---|
| 7,092,727 B1 * | 8/2006 | Li et al. .......................... 455/466 |
| 7,230,937 B2 * | 6/2007 | Chi et al. ....................... 370/329 |
| 7,802,011 B2 * | 9/2010 | Haumont ....................... 709/238 |
| 2002/0068588 A1 * | 6/2002 | Yoshida et al. ................ 455/461 |
| 2002/0141353 A1 * | 10/2002 | Ludwig et al. ................ 370/254 |
| 2003/0108015 A1 * | 6/2003 | Li ................................... 370/338 |
| 2003/0172160 A9 * | 9/2003 | Widegren et al. ............ 709/226 |
| 2003/0235196 A1 * | 12/2003 | Balachandran et al. ...... 370/392 |
| 2004/0001491 A1 * | 1/2004 | Ruutu et al. ................ 370/395.4 |
| 2004/0004949 A1 * | 1/2004 | Cayla et al. .................... 370/338 |
| 2004/0053606 A1 * | 3/2004 | Artamo et al. .............. 455/422.1 |

FOREIGN PATENT DOCUMENTS

| | | |
|---|---|---|
| EP | 1 111 862 | 6/2001 |
| GB | 2 367 719 | 4/2002 |
| JP | 2002-171572 | 6/2002 |
| JP | 2002-314595 | 10/2002 |
| WO | WO 0010357 A1 * | 2/2000 |
| WO | WO 01/86885 | 11/2001 |
| WO | WO 0186885 A1 * | 11/2001 |

* cited by examiner

*Primary Examiner* — Rafael Pérez-Gutiérrez
*Assistant Examiner* — German Viana Di Prisco
(74) *Attorney, Agent, or Firm* — Oblon, Spivak, McClelland, Maier & Neustadt, L.L.P.

(57) ABSTRACT

The object of the present invention is to provide a radio access network system which can adapt to an environment in each network domain, and can carry out the priority transmission control of the IP packets in consideration of traffic requirements. The control apparatus 3 has a priority information setter configured to set priority information for determining a priority of the packet to be transferred in a transfer path set in the network, and a packet processor configured to determine the priority of the received packet in accordance with the priority information, and to add the priority to the received packet.

5 Claims, 8 Drawing Sheets

| TRAFFIC CLASS | PRIORITY |
|---|---|
| CONVERSATIONAL | HIGH PRIORITY |
| STREAMING | HIGH PRIORITY |
| INTERACTIVE | LOW PRIORITY |
| BACKGROUND | LOW PRIORITY |

| IP ADDRESS | UDP PORT NUMBER | TEID | RAB |
|---|---|---|---|
| ... | ... | ... | ... |
| ... | ... | ... | ... |

| RAB | NODE B-SIDE TRANSMISSION/ RECEPTION PORT INFORMATION | | SGSN-SIDE TRANSMISSION/ RECEPTION PORT INFORMATION | | | PRIORITY |
|---|---|---|---|---|---|---|
| | IP ADDRESS | UDP PORT NUMBER | IP ADDRESS | UDP PORT NUMBER | TEID | |
| ... | ... | ... | ... | ... | ... | ... |
| ... | ... | ... | ... | ... | ... | ... |

FIG. 9

| RADIO CHANNEL INFORMATION ||  RAB |
|---|---|---|
| CELL NUMBER | CHANNEL NUMBER | |
| ... | ... | ... |
| ... | ... | ... |

| IP ADDRESS | UDP PORT NUMBER | RAB |
|---|---|---|
| ... | ... | ... |
| ... | ... | ... |

| RAB | UE-SIDE RADIO CHANNEL INFORMATION | | RNC-SIDE TRANSMISSION/ RECEPTION PORT INFORMATION | | PRIORITY |
|---|---|---|---|---|---|
| | CELL NUMBER | CHANNEL NUMBER | IP ADDRESS | UDP PORT NUMBER | |
| ... | ... | ... | ... | ... | ... |
| ... | ... | ... | ... | ... | ... |

RADIO ACCESS NETWORK SYSTEM, RADIO ACCESS METHOD, AND CONTROL APPARATUS

CROSS REFERENCE TO RELATED APPLICATION

This application is based upon and claims the benefit of priority from the prior Japanese Patent Application No. P2002-342448, filed on Nov. 26, 2002; the entire contents of which are incorporated herein by reference.

BACKGROUND OF THE INVENTION

1. Field of the Invention

The present invention relates to a radio access network system which includes a base station and a control apparatus (a radio network controller) and transfers IP packets including control data and user data in a network, a radio access method and a control apparatus.

2. Description of the Related Art

A method of transferring IP packets including control data and user data in the network has recently been defined in "Release 5 RAN IP Transport". The "Release 5 RAN IP Transport" is a standard specification of "3GPP Radio Access Network" in a 3rd Generation Partnership Project (3GPP) as a standardization body of next-generation mobile communication. According to the definition, a control apparatus and a base station (Node B) is configured to set "Diffserve Code Points (DCP)" in IP packets.

Figure 1A:
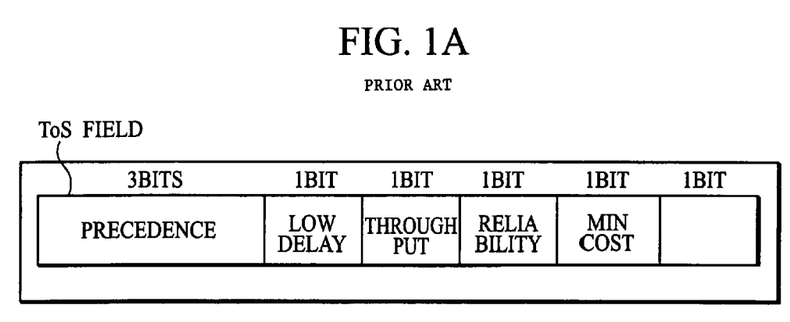
FIGS. 1A and 1B are explanatory views illustrating packet formats of conventional IP packets.
Figure 1B:
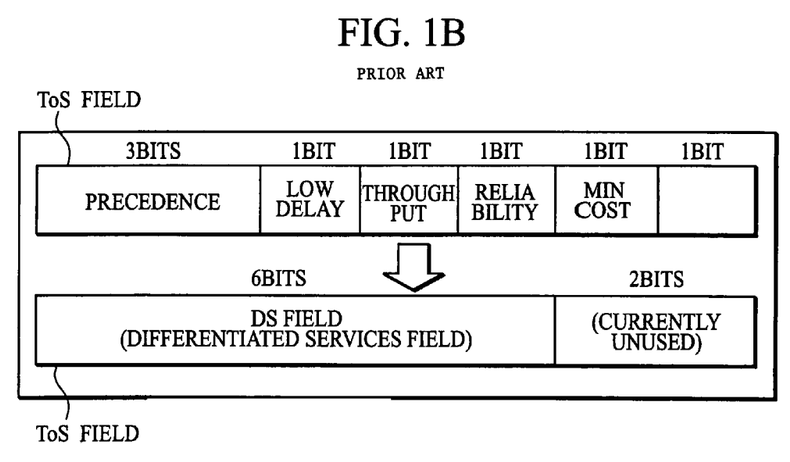

Specifically, as shown in FIG. 1A, the conventional method specifies a priority of an IP packet by using 3 bits of "Precedence" in an 8-bit "ToS (Type of Service) field" in a second octet of the IP packet as QoS (Quality of Service) information. And the conventional method processes the IP packets in accordance with the QoS information as specified by the following four flags set in the "Precedence".
(flag-1) packet delay characteristics: delay is kept to a minimum
(flag-2) throughput: throughput is maximized
(flag-3) reliability: reliability is maximized
(flag-4) cost: cost is kept to a minimum As shown in FIG. 1B, the conventional method using the Diffserve technique defines a 6-bit DS (Differentiated Service) field in the ToS field, and specifies the process of the IP packets in a predetermined network domain, by writing a DSP which is a local value in a DS domain in the DS field.

However, the conventional method has not defined a method of notifying a determined packet format including setting the ToS field in the IP packets to the control apparatus or the base station, and a transmitting process over the radio line.

Also the standard specification of the 3GPP has not defined a method of determining the DCP in the respective network domains, a method of notifying the determined IP packet format to the control apparatus or the base station, and a method of using the DCP in the transmitting process over the radio line, etc.

Therefore, there is a problem in that priority transmission control of the IP packets cannot be carried out in an IP-based network, for example, the IP packets requiring real-time communication strict on delay cannot be transmitted with priority, so that it has been impossible to satisfy traffic requirements.

BRIEF SUMMARY OF THE INVENTION

In view of the foregoing, it is an object of the present invention to provide a radio access network system which can adapt to an environment in each network domain, and can carry out the priority transmission control of IP packets in consideration of traffic requirements such as real-time communication of the IP packets, in an IP-based network, a radio access method and a control apparatus.

A first aspect of the present invention is summarized as a radio access network system for transferring a packet in a network including a base station and a control apparatus. The radio access network system has a transfer path setter configured to set a transfer path for the packet in the network; a priority information setter configured to set priority information for determining a priority of the packet to be transferred at the base station and the control apparatus which are included in the transfer path; and a packet processor configured to determine the priority of the received packet in accordance with the priority information, and to add the priority to the received packet.

A second aspect of the present invention is summarized as a radio access method for transferring a packet in a network including a base station and a control apparatus. The method has the steps of: (a) setting a transfer path for the packet in the network; (b) setting priority information for determining a priority of the packet to be transferred at the base station and the control apparatus which are included in the transfer path; and (c) determining the priority of the received packet in accordance with the priority information, and adding the priority to the received packet, in the base station and the control apparatus.

A third aspect of the present invention is summarized as a control apparatus for transferring a packet in a network. The control apparatus has a priority information setter configured to set priority information for determining a priority of the packet to be transferred in a transfer path set in the network; and a packet processor configured to determine the priority of the received packet in accordance with the priority information, and to add the priority to the received packet.

In the third aspect, the priority information setter may set the priority information in accordance with whether the packet to be transferred belongs to a traffic class requiring real-time communication or not.

In the third aspect, the control apparatus may further have a field information notifier configured to notify field information showing a format of a predetermined field in the packet. The packet processor may add the priority to the predetermined field in the received packet in accordance with the notified field information.

In the third aspect, the packet processor may add the priority to the predetermined field of a common format in the whole network or a predetermined network domain, in accordance with the notified field information.

In the third aspect, the priority information setter may set the priority information in accordance with a flag showing which one of the packet delay characteristics, throughput, reliability or cost takes top priority. The flag is defined in the predetermined field.

DETAILED DESCRIPTION OF THE INVENTION

Figure 2A:
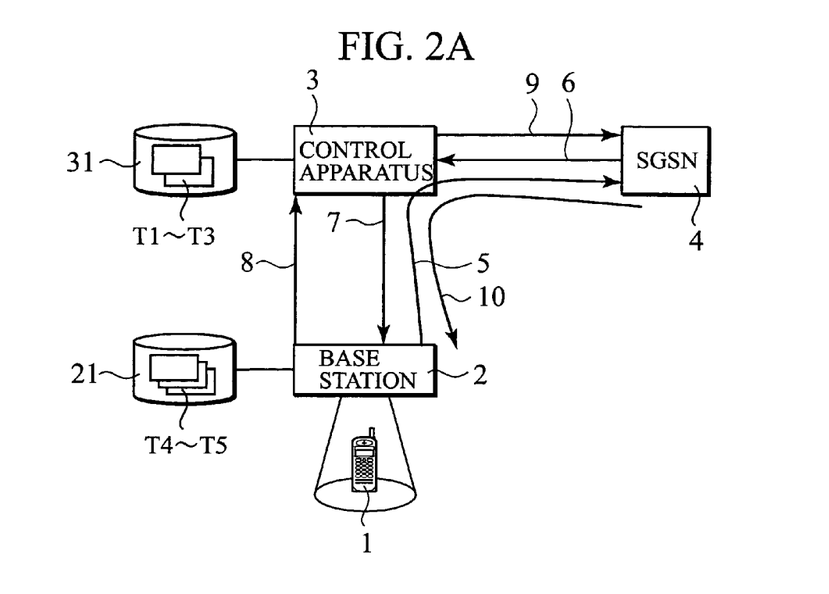
FIG. 2A is an explanatory view illustrating an entire configuration of a radio access network system according to an embodiment.
Figure 2B:
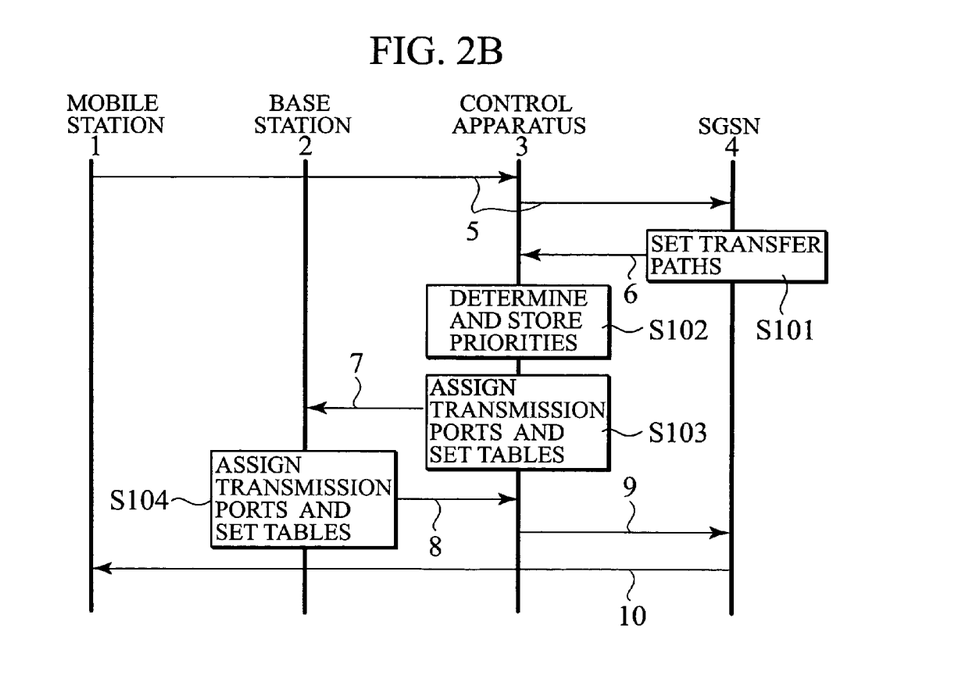
FIG. 2B is an explanatory view illustrating a data flow of processing during connection setting according to the embodiment.

A radio access network according to an embodiment of the present invention will be described in detail. FIG. 2A illustrates an entire configuration of the radio access network system according to the embodiment, FIG. 2B illustrates a data flow in the radio access network system according to the embodiment.

As shown in FIG. 2A, the radio access network system according to the embodiment is configured with a mobile station 1, a base station 2, a control apparatus 3 and an SGSN (serving GPRS support node) 4.

The radio access network system according to the embodiment transfers IP packets in a radio access network including a base station 2 and a control apparatus 3.

The SGSN 4 is configured to control connection to a core network. The SGSN 4 is configured to set a transfer path of IP packets in the core network, in response to a request from the mobile station 1. The transfer path links the mobile station 1, the base station 2, the control apparatus 3 and the SGSN 4.

The SGSN 4 is configured to instruct the base station 2 and the control apparatus 3 in the radio access network to set an RAB (Radio Access Bearer) corresponding to the transfer path.

The control apparatus 3 is configured to manage and control operations of the base station 2. As shown in FIG. 2A, the control apparatus 3 includes a function of transferring IP packets from the base station 2 to the SGSN 4 as well as IP packets from the SGSN 4 to the base station 2.

Figure 4:
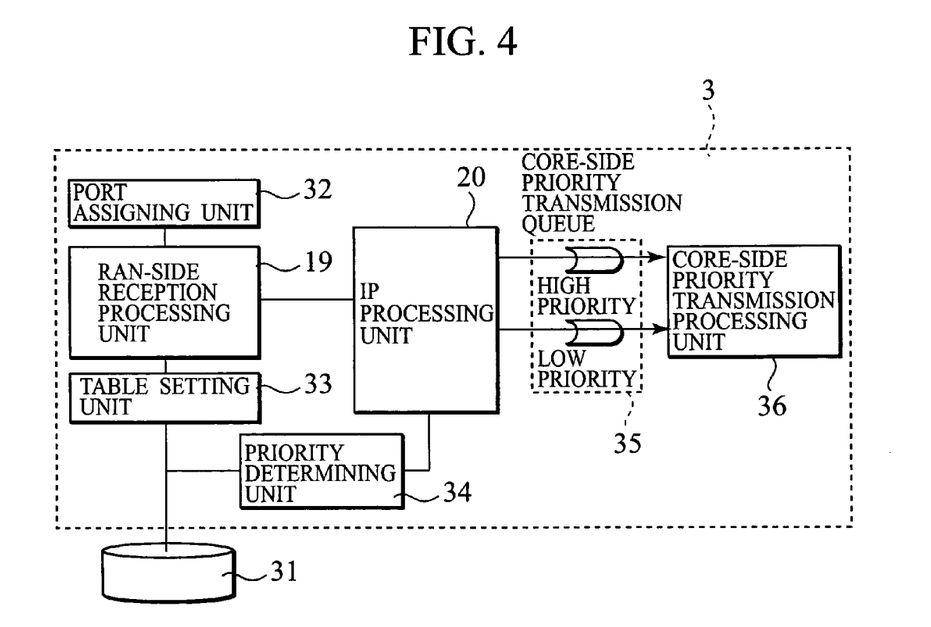
FIG. 4 is a view showing functional blocks of a control apparatus according to the embodiment.

As shown in FIG. 4, the control apparatus 3 is configured with an RAN-side reception processing unit 19, an IP processing unit 20, a database 31, a port assigning unit 32, a table setting unit 33, a priority determining unit 34, core-side priority transmission queues 35 and a core-side priority transmission processing unit 36.

The database 31 stores a priority determination table T1, an RAB identification table T2 and a destination port information table T3.

Figure 5:
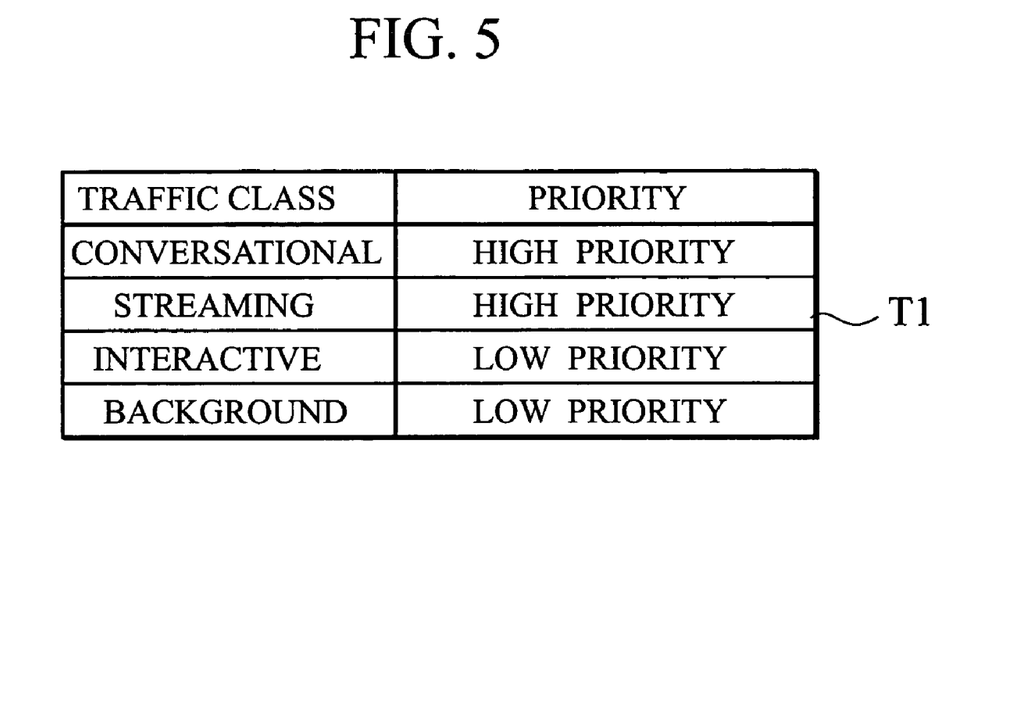
FIG. 5 is an explanatory view illustrating contents of a priority determination table according to the embodiment.

As shown in FIG. 5, the priority determination table T1 stores priority information for determining the priority (such as DCP or ToS) of IP packets, based on a traffic class regarding the RAB. The priority determination table T1 associates the traffic class with the priority.

For example, the priority of the traffic classed as "conversational" or "streaming" is set to be higher than the priority of traffic classed as "interactive" or "background". The traffic classed as "conversational" or "streaming" belongs to a real-time traffic requiring real-time communication, and the traffic classed as "interactive" or "background" belongs to a non real-time traffic which does not require real-time communication.

Figure 7:
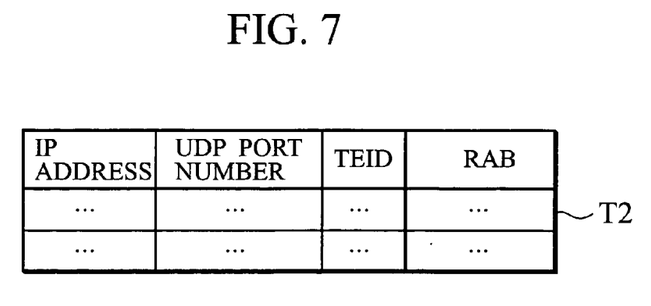
FIG. 7 is an explanatory view illustrating contents of an RAB identification table according to the embodiment.

As shown in FIG. 7, the RAB identification table T2 stores priority information in association with an IP address, a UDP port number, a TEID (tunneling endpoint identifier) and an RAB, with respect to a received packet.

Figure 8:
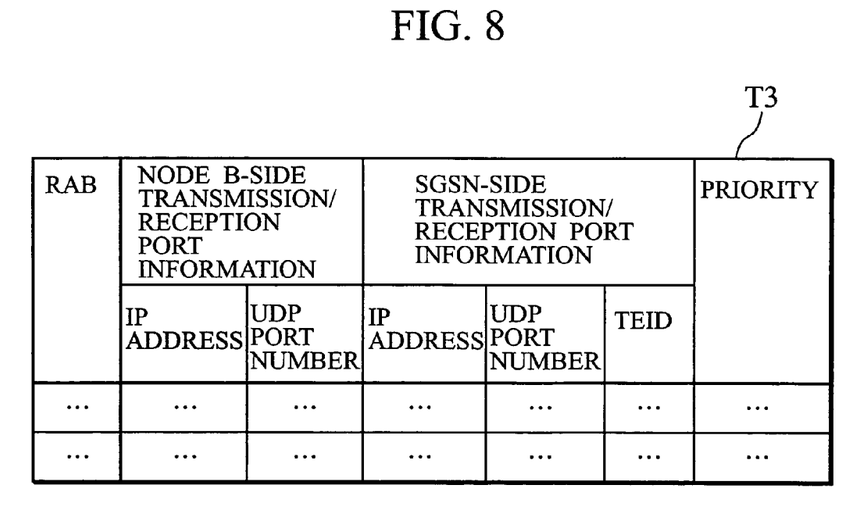
FIG. 8 is an explanatory view illustrating contents of a destination port information table according to the embodiment.

As shown in FIG. 8, the destination port information table T3 stores priority information in association with Node B-side transmission/reception port information, SGSN-side transmission/reception port information and a priority, with respect to a predetermined RAB. The Node B-side transmission/reception port information includes an IP address and a UDP port number of the base station (Node B) side, the SGSN-side transmission/reception port information includes an IP address and a UDP port number of the SGSN side.

The port assigning unit 32 is configured to assign a transmission/reception port for the base station 2 or the SGSN 4 with respect to the specified RAB.

The table setting unit 33 is configured to set an RAB identification table T2 and the destination port information table T3 with respect to the set RAB.

The priority determining unit 34 is configured to determine the priority (such as the DCP or the ToS) of the IP packets, in accordance with the traffic class contained in a received message and the traffic class set in the priority determination table T1 held in the database 31.

The RAN-side reception processing unit 19 is configured to refer to the RAB identification table T2 based on an IP address of a reception port of a received IP packet 12 and a UDP port number of the received IP packet 12 so as to specify a relevant RAB.

The IP processing unit 20 is configured to obtain the SGSN-side transmission/reception port information regarding the transmission port with which the IP packet is to be transmitted, based on the specified RAB as a key.

The IP processing unit 20 is configured to regenerate the IP packet in which the IP address and the UDP port number of the obtained SGSN-side transmission/reception port information are set.

The IP processing unit 20 is configured to put the IP packet into one of the core-side priority transmission queuing units 35 according to the priority set in the received IP packet.

The core-side priority transmission processing unit 36 is configured to carry out a priority transmission process in accordance with the priority set in each IP packet.

The base station 2 is configured to manage an area in which the mobile station 1 is present.

Figure 3:
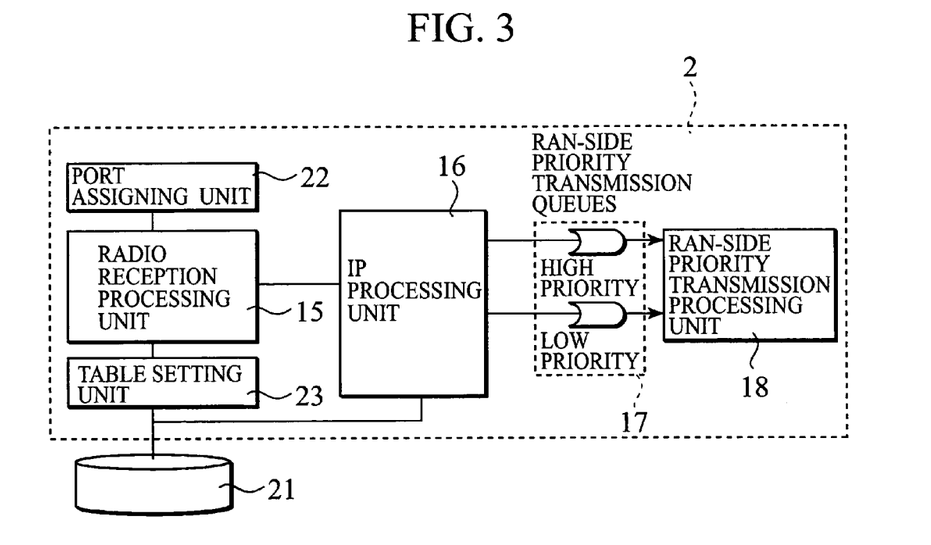
FIG. 3 is a view showing functional blocks of a base station according to the embodiment.

As shown in FIG. 3, the base station 2 is configured with a radio reception processing unit 15, an IP processing unit 16, RAN-side priority transmission processing unit 18, a database 21, a port assigning unit 22, a table setting unit 23.

The database 21 stores a radio channel RAB identification table T4, a RAN transmission/reception port RAB identification table T5 and a base station transmission/reception port information table T6, so as to allow IP packet communication between the mobile station 1 and the control apparatus 3.

The table setting unit 23 is configured to set the radio channel RAB identification table T4, the RAN transmission/reception port RAB identification table T5, and the base station transmission/reception port information table T6.

Figure 9:
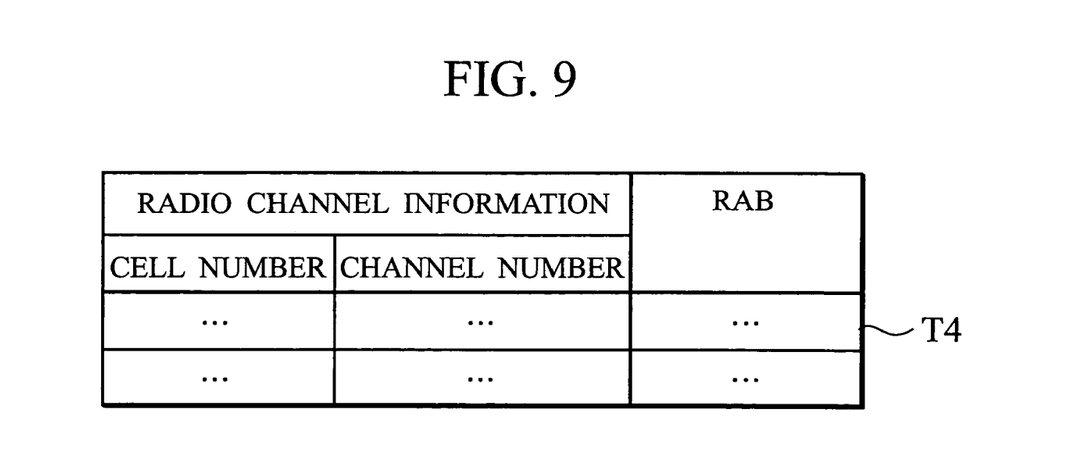
FIG. 9 is an explanatory view illustrating contents of an RAB identification table for a radio channel according to the embodiment.

As shown in FIG. 9, the radio channel RAB identification table T4 stores priority information associating radio channel information with an RAB, with respect to a specified radio channel. The radio channel information includes a cell number and a channel number.

Figure 10:
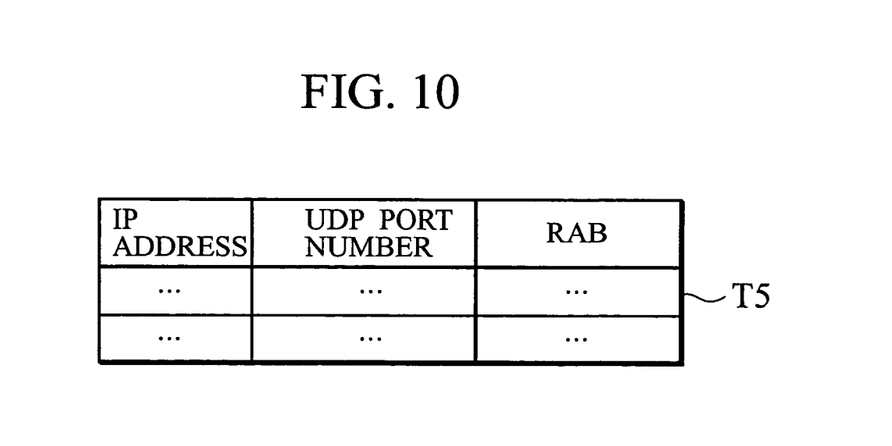
FIG. 10 is an explanatory view illustrating contents of an RAB identification table for an RAN transmission/reception port according to the embodiment.

As shown in FIG. 10, the RAN transmission/reception port RAB identification table T5 stores priority information in association with an IP address, a UDP port number and an RAB, with respect to a received IP packet.

Figure 11:
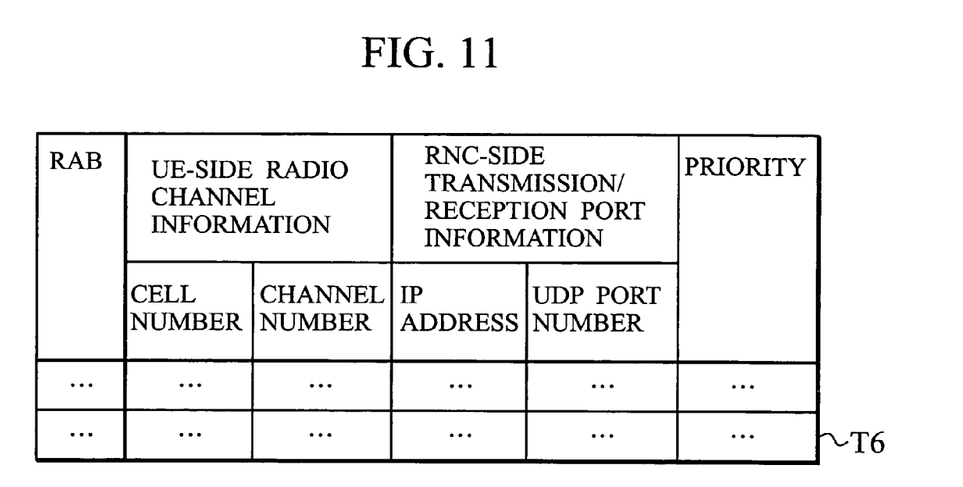
FIG. 11 is an explanatory view illustrating contents of an information table for a base station transmission/reception port according to the embodiment.

As shown in FIG. 11, the base station transmission/reception port information table T6 stores priority information in association with an RAB, UE-side radio channel information, RNC-side radio channel information and a priority. The UE-side radio channel information includes a cell number and a channel number of a radio channel connected to the mobile station (UE) 1, the RNC-side radio channel information includes an IP address and a UDP port number of a session connected to the control apparatus (RNC) 3.

The port assigning unit 22 is configured to assign a radio channel to the RAB and assign a transmission/reception port to the control apparatus 3.

The radio reception processing unit 15 is configured to specify a radio channel via which a specified IP packet transmitted from the mobile station 1 is received, so as to specify an RAB relevant to the radio channel by referring to the radio channel RAB identification table T4.

The IP processing unit 16 is configured to obtain priority and port information with respect to the received IP packet, by referring to the base station transmission/reception port information table T6 based on the RAB specified by the radio reception processing unit 15.

The IP processing unit 16 is configured to regenerate an IP packet in which the priority, the IP address and the UDP port number of the port information are set.

The IP processing unit 16 is configured to put the regenerated IP packet into one of the RAN-side priority transmission queues 17 according to its priority.

The RAN-side priority transmission unit 18 is configured to transmit IP packets put into a high priority queue of the RAN-side priority transmission queues 17 at a ratio higher than IP packets put into a low priority queue, using a weight fair queue (WFQ), for example.

(Processing During Connection Setting)

Referring to FIG. 2A and FIG. 2B, a priority setting process during connection setting according to the embodiment which has the foregoing configuration will be described. The connection setting sets a transfer path for IP packets between the mobile station 1 and the SGSN 4 in the radio access network system.

First, the mobile station 1 transmits a message 5 to the radio access network (the control apparatus 3 and the SGSN 4). The message 5 is the 3GPP-defined "Activate PDP Context Request" for requesting setting of a transfer path for IP packets. This message 5 contains a QoS information regarding a traffic class of IP packets transferred through the set transfer path.

The base station 2 and the control apparatus 3 transfer the message 5 to the SGSN 4 of the core network.

In step S101, the SGSN 4 sets a transfer path for the IP packets in the core network, and transmits a message 6 to the control apparatus 3. The message 6 is the 3GPP-defined "RAB Assignment Request" for instructing the setting of an RAB between the SGSN 4 and the mobile station 1 linked to the transfer path. This message 6 contains the traffic class set in the message 5.

In step S102, the priority determining unit 34 of the control apparatus 3 determines a priority (such as the DCP or the ToS) of the IP packets to be transferred over the traffic path, by referring to the priority determination table T1 based on the traffic class contained in the received message 6. Then the priority determining unit 34 stores the determined priority to the database (memory) 31.

In step S103, the port assigning unit 32 of the control apparatus 3 assigns a transmission/reception port between the base station 2 and the SGSN 4, so as to set a RAB.

Then, the table setting unit 33 of the control apparatus 3 sets the RAB identification table T2 and the destination port information table T3 in the database 31, with respect to the set RAB, so as to allow IP packet communication between the base station 2 and the SGSN 4.

In other words, the control apparatus 3 sets the priority information in accordance with whether the IP packet to be transferred belongs to a traffic class requiring real-time communication or not.

The control apparatus 3 may set the priority information in accordance with a flag showing which one of the packet delay characteristics, throughput, reliability or cost takes top priority. The flag is defined in the predetermined field.

Figure 6:
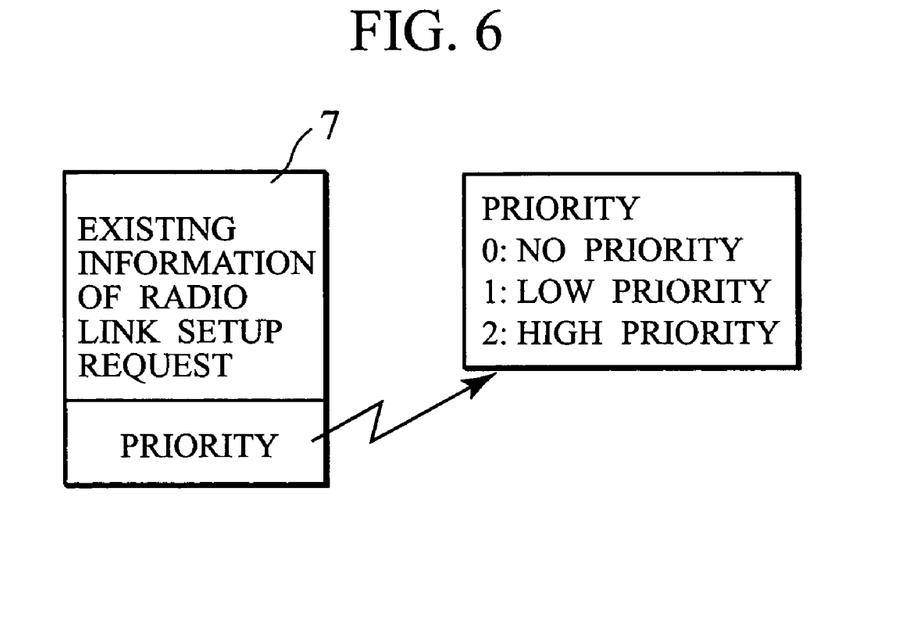
FIG. 6 is an explanatory view illustrating a message transmitted from a control apparatus to a base station according to the embodiment.

Subsequently, the control apparatus 3 generates a message 7 containing the decided priority. As shown in FIG. 6, the message 7 is the 3GPP-defined "Radio Link Setup Request" in which an IP address and a UDP port number of the transmission/reception port to be used in the control apparatus 3 are set. The control apparatus 3 transmits the generated message 7 to the base station 2.

The control apparatus 3 may add the priority to the predetermined field in the received IP packet in accordance with field information. The control apparatus 3 may notify the field information showing a format of a predetermined field in the IP packet.

The control apparatus 3 may add the priority to the predetermined field of a common format in the whole network or a predetermined network domain, in accordance with the notified field information.

In step S104, the port assigning unit 22 of the base station 2 assigns a radio channel and a transmission/reception port relative to the control apparatus 3 to the RAB to be set.

Then, the table setting unit 23 of the base station 2 sets the radio channel RAB identification table T4, the RAN transmission/reception port RAB identification table T5, and the base station transmission/reception information table T6, so as to allow IP packet communication between the mobile station 1 and the control apparatus 3.

Thereafter, the base station 2 transmits a message 8 to the control apparatus 3. The message 8 is the 3GPP-defined "Radio Link Setup Response" indicating completion of setting a radio link to the control apparatus 3.

The control apparatus 3 transmits a message 9 to the SGSN 4. The message 9 is the 3GPP-defined "RAB Assignment Response" indicating completion of RAB setting.

The SGSN 4 transmits a message 10 to the mobile station 1, so that the procedure for setting the transfer path for the IP packets is finished. The message 10 is the 3GPP-defined "Activate PDP Context Accept" for notifying completion of the transfer path setting.

(Processing During Ip Packet Communication)

Figure 12A:
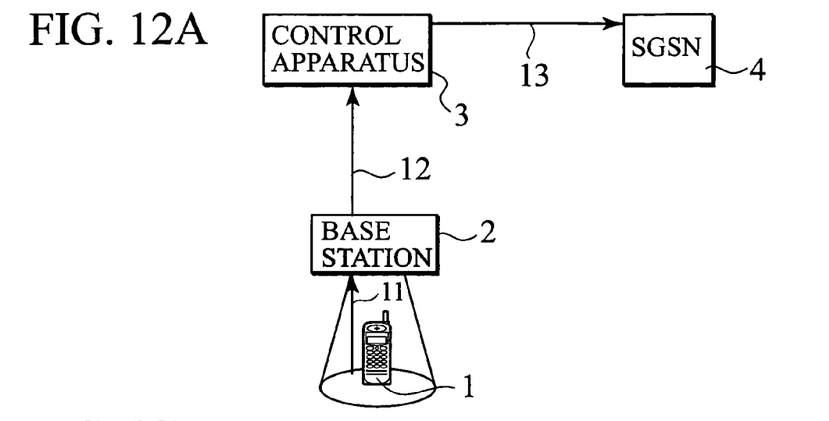
FIG. 12A is an explanatory view illustrating the entire configuration of the radio access network system according to the embodiment.
Figure 12B:
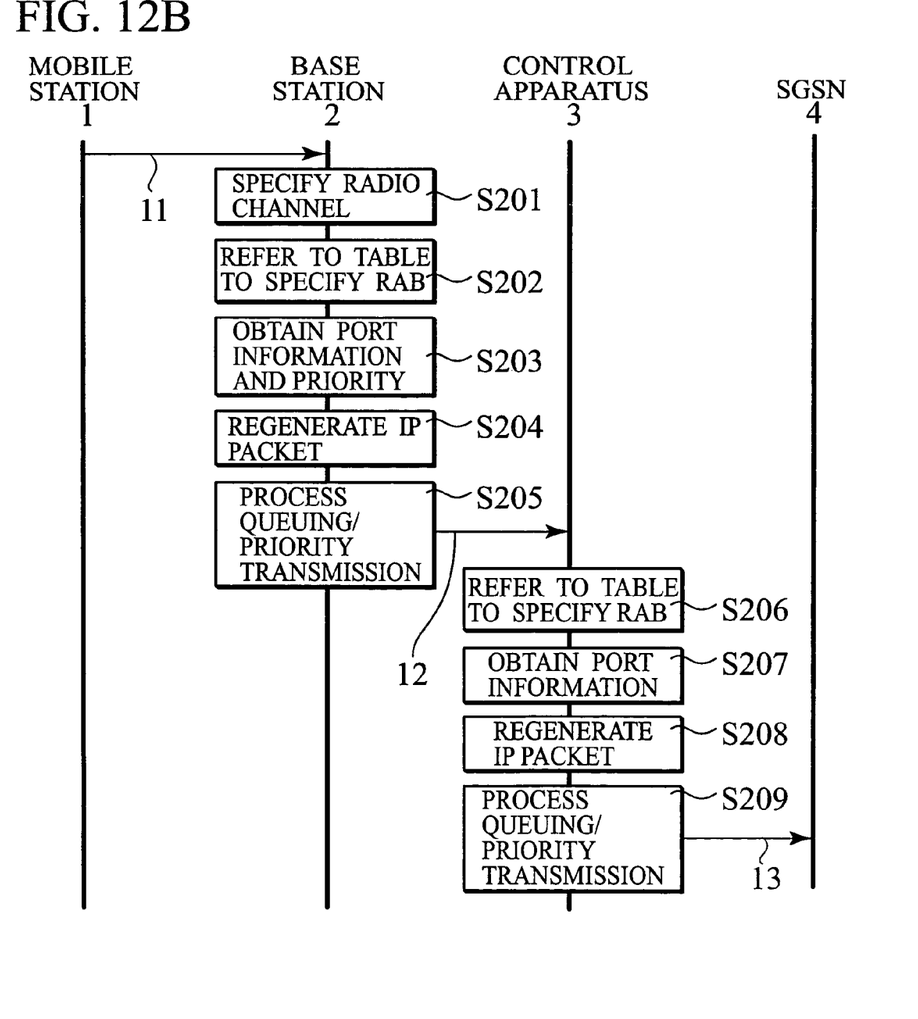
FIG. 12B is an explanatory view illustrating a data flow of processing during IP packet transmitting/receiving according to the embodiment.

Referring to FIG. 12A and FIG. 12B, priority transmission control processing during IP packet communication after setting of the transfer path for the IP packets will be described. FIGS. 12A and 12B are explanatory views illustrating an operation during IP packet communication.

In step S201, the radio reception processing unit 15 of the base station 2 specifies a cell number and a channel number of a radio channel over which a IP packet transmitted from the mobile station 1 is received.

In step S202, the radio reception processing unit 15 specifies an RAB associated with the specified cell number and channel number, by referring to the radio channel RAB identification table T4.

In step S203, the IP processing unit 16 receives the IP packet from the reception processing unit 15, and refers to the base station transmission/reception port information table T6 based on the specified RAB, so as to obtain the RNC-side transmission/reception port information and the priority.

In step S204, the IP processing unit 16 regenerates an IP packet containing the priority, the IP address and the UDP port number of the RNC-side transmission/reception port information.

In step S205, the IP processing unit 16 puts the regenerated IP packet into one of the RAN-side priority transmission queue units 17 according to its priority.

For example, the RAN-side priority transmission processing unit 18 transmits an IP packet put into a high priority queue of the RAN-side priority transmission queue units 17 at a ratio higher than an IP packet put into a low priority queue, using the weight fair queue (WFO).

As shown in FIG. 12A and FIG. 12B, the IP packet 12 is transmitted from the base station 2 to the control apparatus 3.

In step S206, the RAN-side reception processing unit 19 of the control apparatus 3 refers to the RAB identification table T2 based on an IP address and a UDP port number of the received IP packet, so as to specify a relevant RAB.

In step S207, the IP processing unit 20 obtains the SGSN-side transmission/reception port information with respect to the SGSN 4 to which the IP packet is to be transferred, by using the specified RAB as a key.

In step S208, the IP processing unit 20 regenerates an IP packet containing the IP address and the UDP port number of the SGSN-side transmission/reception port information.

In step S209, the IP processing unit 20 puts the regenerated IP packet into one of the core-side priority transmission queue units 35 according to the priority set in the received IP packet.

Then, the core-side priority transmission processing unit 36 transmits the IP packet put into one of the core-side priority transmission queue units 35 in accordance with the priority as in the case of the RAN-side priority transmission processing unit 18 of the base station 2.

As shown in FIG. 12A and FIG. 12B, the IP packet 13 is transmitted from the control apparatus 3 to the SGSN 4.

(Operation and Effect)

According to the radio access network system of the embodiment, the priority transmission control is carried out based on the priority (such as the DCP or ToS) set for the IP packet in the radio access network.

Thus, the control apparatus 3 determines the priority (such as the DCP or ToS) in accordance with a traffic class of each IP packet, and a proper priority can be set based on a common format in a whole network or a predetermined network domain.

According to the radio access network system of the embodiment, at the time of setting the transfer path, the priority is added to the IP packet as information regarding handling of the IP packet at the base station 2, the control apparatus 3, a relay station (not shown) or the like located on the transfer path respectively.

Thus, the IP packet can be transferred based on its respective priority over the transfer path.

According to the radio access network system of the embodiment, the priority of traffic classed in the real-time traffic class of "conversational" or "streaming" is preset to be higher than the priority of traffic classed in the non real-time traffic class of "interactive" or "background".

Thus, priority setting can be properly carried out in accordance with the real-time communication requirement of the IP packet.

According to the radio access network system of the embodiment, for example, the priority information can be transmitted by using a predetermined field (DCP or ToS field) set on the IP packet of the 3GPP or the like.

That is, the IP packets can be transferred in consideration of the priority information in each network domain, by notifying a local format (field information) set in the respective network domain to each other.

According to the radio access network system of the embodiment, for example, the present invention can be applied to a case in which a system operated by using a common format in the whole network such as the ToS field, and a system operated by using a common format (a local format) set in each predetermined network domain such as the DCP are mixed.

According to the radio access network system of the embodiment, the priority can be set by using the ToS field disposed in the existing IP packet, and the system can be operated by mixing the existing network with a next-generation network.

As described above, according to the present invention, the priority transmission control of the IP packet which uses the DCP and ToS can be carried out in the IP-based RAN, whereby, for example, a IP packet which requires real-time communication strict on delay can be transmitted with high priority. Thus, it is possible to carry out IP packet communication based on traffic requirements.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A radio access network system for transferring user data in a radio access network, comprising:
   a base station configured to communicate the user data with a mobile station via a radio channel; and
   a control apparatus configured to control the base station, wherein,
   the mobile station transmits a transfer path setting request, for requesting to set a transfer path of the user data, to a core network via the radio access network,
   the control apparatus receives a transfer path assignment request for requesting to assign the transfer path of the user data, from the core network, the transfer path assignment request including a traffic class regarding a radio access bearer established between the mobile station and the core network,
   the control apparatus sets the transfer path of the user data, in accordance with the transfer path assignment request, the control apparatus sets and IP priority used in the radio access network, based on the traffic class included in the transfer path assignment request, in accordance with a priority determination table for associating the traffic class with the IP priority, the control apparatus transmits, to the base station, a radio channel setting request for requesting to set the radio channel, the radio channel setting request including the IP priority, the base station associates the IP priority included in the radio channel setting request with the radio channel, the mobile station transmits the user data to the base station via the radio channel, the base station generates an IP packet based on the user data, and sets the IP priority to the IP packet, in accordance with association between the IP priority and the radio channel, the base station transmits the IP packet generated in the base station to the control apparatus, in accordance with IP priority, and the control apparatus transmits the IP packet received from the base station to the core network, in accordance with the IP priority.

2. The radio access network system according to claim 1, wherein:

the base station adds the IP priority to a predetermined field in the IP packet.

3. The radio access network system according to claim 1, wherein the base station stores the IP packet into one of a plurality of RAN-side priority transmission queues according to the IP priority, and the base station transmits IP packets stored in a high-priority queue at a rate higher than IP packets stored in a low priority queue.

4. The radio access network system according to claim 1, wherein the control apparatus stores the IP packet into one of a plurality of core-side priority transmission queues according to the IP priority, and the control apparatus transmits IP packets stored in a high-priority queue at a rate higher than IP packets stored in a low priority queue.

5. A radio access method for transferring user data in a radio access network comprising a base station configured to communicate the user data with a mobile station via a radio channel, and a control apparatus configured to control the base station, the method comprising:

transmitting, from the mobile station to a core network via the radio access network, a transfer path setting request for requesting to set a transfer path of the user data;

receiving, at the control apparatus, a transfer path assignment request for requesting to assign the transfer path of the user data, from the core network, the transfer path assignment request including a traffic class regarding a radio access bearer established between the mobile station and the core network;

setting, at the control apparatus, the transfer path of the user data, in accordance with the transfer path assignment request;

setting, at the control apparatus, an IP priority used in the radio access network, based on the traffic class included in the transfer path assignment request, in accordance with a priority determination table for associating the traffic class with the IP priority;

transmitting, from the control apparatus to the base station, a radio channel setting request for requesting to set the radio channel, the radio channel setting request including the IP priority;

associating, at the base station, the IP priority included in the radio channel setting request with the radio channel;

transmitting the user data from the mobile station to the base station via the radio channel;

generating, at the base station, an IP packet based on the user data, and setting the IP priority to the IP packet, in accordance with association between the IP priority and the radio channel;

transmitting the IP packet generated in the base station from the base station to the control apparatus, in accordance with the IP priority, and transmitting, from the control apparatus to the core network, the IP packet received from the base station, in accordance with the IP priority.

* * * * *